(12) United States Patent
Kamiya et al.

(10) Patent No.: US 10,797,293 B2
(45) Date of Patent: Oct. 6, 2020

(54) BATTERY PACK

(71) Applicant: TOYOTA JIDOSHA KABUSHIKI KAISHA, Toyota-shi, Aichi-ken (JP)

(72) Inventors: Masato Kamiya, Toyota (JP); Masaru Ishii, Miyoshi (JP); Takayuki Hojo, Nagoya (JP); Tetsuya Kaneko, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 242 days.

(21) Appl. No.: 15/809,428

(22) Filed: Nov. 10, 2017

(65) Prior Publication Data

US 2018/0138487 A1 May 17, 2018

(30) Foreign Application Priority Data

Nov. 17, 2016 (JP) .................................. 2016-224055

(51) Int. Cl.
*H01M 2/26* (2006.01)
*H01M 10/0525* (2010.01)
*H01M 2/10* (2006.01)
*H01M 2/30* (2006.01)
*H01M 2/20* (2006.01)

(52) U.S. Cl.
CPC ............ *H01M 2/26* (2013.01); *H01M 2/1072* (2013.01); *H01M 2/202* (2013.01); *H01M 2/30* (2013.01); *H01M 10/0525* (2013.01); *H01M 2220/20* (2013.01)

(58) Field of Classification Search
CPC ...... H01M 2/26; H01M 2/1072; H01M 2/202; H01M 2/30; H01M 10/0525; H01M 2220/20
See application file for complete search history.

(56) References Cited

U.S. PATENT DOCUMENTS

| | | | |
|---|---|---|---|
| 2012/0013340 A1* | 1/2012 | Yuasa | H01M 2/206 324/430 |
| 2015/0180004 A1 | 6/2015 | Harayama | |
| 2016/0093854 A1* | 3/2016 | Tyler | H01M 2/1077 429/156 |
| 2016/0344013 A1* | 11/2016 | Lee | H01M 2/202 |

FOREIGN PATENT DOCUMENTS

| | | | |
|---|---|---|---|
| JP | 2009-43570 A | 2/2009 | |
| JP | 2014-006977 A | 1/2014 | |
| JP | 2014-44817 A | 3/2014 | |
| KR | 20160094010 A * | 8/2016 | ............ H01M 2/202 |

* cited by examiner

*Primary Examiner* — Stewart A Fraser
(74) *Attorney, Agent, or Firm* — Sughrue Mion, PLLC

(57) ABSTRACT

A battery pack includes a plurality of unit cells, each including an electrode body having a structure in which a positive electrode and a negative electrode are stacked, and a busbar that electrically connects a positive electrode terminal to a negative electrode terminal between the unit cells. The unit cells are stacked adjacent to one another in the same direction as a direction in which the positive electrode and the negative electrode of the electrode body are stacked. The busbar electrically connects the unit cells disposed apart from each other among the unit cells excluding the unit cells disposed adjacent to each other.

7 Claims, 5 Drawing Sheets

BATTERY PACK

INCORPORATION BY REFERENCE

The disclosure of Japanese Patent Application No. 2016-224055 filed on Nov. 17, 2016 including the specification, drawings and abstract is incorporated herein by reference in its entirety.

BACKGROUND

1. Technical Field

The present disclosure relates to a battery pack. More particularly, the present disclosure relates to a battery pack formed by using a secondary battery as a unit cell and connecting a plurality of the unit cells.

2. Description of Related Art

A battery pack which uses a lithium-ion secondary battery, a nickel-metal hydride battery, other secondary batteries, or a storage element such as a capacitor as a unit cell and is provided with a plurality of the unit cells becomes more important as an on-vehicle power supply or a power supply for a personal computer, a portable terminal, or the like. In particular, a battery pack which uses a lithium-ion secondary battery that is lightweight and achieves a high energy density as a unit cell is preferably used as an on-vehicle high-output power supply.

An example of the battery pack is illustrated in FIG. 8. A battery pack 100 includes a plurality of flat rectangular unit cells 110A to 110C. The unit cells 110A to 110C are arranged along an arrangement direction x such that the wide surfaces (flat surfaces) of the unit cells 110A to 110C are adjacent to one another. In the battery pack 100, positive electrode terminals 112 and negative electrode terminals 114 are electrically and sequentially connected by busbars 140 between the unit cells 110A to 110C. Another example of the battery pack is a battery pack described in Japanese Unexamined Patent Application Publication No. 2014-6977 (JP 2014-6977 A).

A battery pack having such a secondary battery as a component (unit cell) needs to achieve a high level of safety as well as superior battery performance. Therefore, various techniques for improving the safety of the battery pack have been proposed in the related art. For example, when unit cells generate heat during use, the unit cells mutually heat each other, and the temperature of the entire battery pack may rapidly increase. Therefore, techniques for suppressing an increase in the temperature of the unit cells constituting the battery pack have been proposed in the related art.

SUMMARY

However, when the battery pack is mounted on a moving object such as a vehicle to be used, as illustrated in FIG. 9, in a case where sharp conductive foreign matter such as a nail penetrates through the unit cells constituting the battery pack 100 to penetrate through a positive electrode 132 and a negative electrode 135 of each of the unit cells in a stacking direction of the positive and negative electrodes, a short circuit current may be generated in the unit cells 110A to 110C, and there is a possibility that the temperature of the unit cells 110A to 110C may rapidly increase due to Joule heating by the short circuit current. At this time, although a temperature increase that occurs in the first unit cell 110A disposed on the most upstream side is approximately equal to a temperature increase that occurs in a case where conductive foreign matter is stuck in a single lithium-ion secondary battery, a more rapid temperature increase may occur in the second and subsequent unit cells 110B, 110C than in the first unit cell 110A.

For example, when the conductive foreign matter F penetrates through the unit cells 110A to 110C in the stacking direction of the positive and negative electrodes, an external short circuit occurs in which a short circuit current E1 flows between the unit cells 110A, 110B via the busbars 140 and the conductive foreign matter F. In this case, two short circuit currents (about 700 A in total) including a short circuit current E2 that is generated inside the second unit cell 110B and the short circuit current E1 of the external short circuit flow into the negative electrode 135 of the second unit cell 110B, and a rapid temperature increase may occur in the second unit cell 110B. In addition, in a battery pack having two or more unit cells, a rapid temperature increase caused by an external short circuit may occur in the second and subsequent unit cells (for example, in the unit cell 110C in FIG. 9).

The disclosure provides a battery pack capable of, when sharp conductive foreign matter is stuck into the battery pack having a plurality of unit cells connected to one another, suppressing an external short circuit that may occur between the unit cells, and suitably suppressing a rapid temperature increase in the unit cells caused by a short circuit current.

The disclosure provides a battery pack having the following configuration.

An aspect relates to a battery pack including a plurality of unit cells each including an electrode body having a structure in which a positive electrode and a negative electrode are stacked, the unit cells being stacked adjacent to one another in the same direction as a direction in which the positive electrode and the negative electrode of the electrode body are stacked, and a busbar that electrically connects a positive electrode terminal of one of the unit cells to a negative electrode terminal of another of the unit cells, the unit cells being disposed apart from each other among the plurality of the unit cells excluding the unit cells disposed adjacent to each other.

The present inventors studied, focusing on the fact that in a case where conductive foreign matter is stuck and penetrates into a unit cell, a negative electrode is broken by an internal short circuit in the unit cell. Specifically, when conductive foreign matter is stuck into a unit cell such as a lithium-ion secondary battery, an internal short circuit in which a short circuit current flows occurs inside the unit cell, and a negative electrode is broken by the internal short circuit, resulting in a significant increase in the contact resistance between the negative electrode and the conductive foreign matter. The present inventors focused on the phenomenon and thought that when the conductive foreign matter penetrates through a plurality of unit cells, when the negative electrode can be broken by the internal short circuit before an external short circuit occurs via the conductive foreign matter and a busbar, the external short circuit that occurs between the unit cells can be suppressed, and a rapid temperature increase in the unit cells can be suppressed.

The battery pack disclosed herein is based on the knowledge, and each of the unit cells constituting the battery pack is electrically connected to the unit cells disposed apart therefrom, excluding the unit cells disposed adjacent thereto, by the busbar. Accordingly, when the conductive foreign matter is stuck into the battery pack and penetrates through the unit cells, the time taken until an external short circuit occurs via the conductive foreign matter and the busbar becomes longer than that in a battery pack in the related art in which adjacent unit cells are electrically connected to each other. Therefore, the negative electrode of the unit cell through which the conductive foreign matter penetrates is damaged by the internal short circuit before an external short circuit occurs via the conductive foreign matter and the busbar, and the contact resistance between the negative electrode and the conductive foreign matter can be significantly increased. Accordingly, the external short circuit that occurs between the unit cells is suppressed, and a rapid temperature increase in the unit cells can be suppressed.

According to the aspect, the unit cells that are electrically connected to each other by the busbar and are disposed apart from each other may be disposed with an interval of 25 mm or more between the unit cells. In a case of a general unit cell, it takes about 0.5 seconds for a negative electrode to be broken by an internal short circuit after conductive foreign matter penetrates through the unit cell. As described above, in a case where the interval between the unit cells connected by the busbar is set to 25 mm or more, it takes about 1 second after the conductive foreign matter penetrates through the first unit cell included in the battery pack until the conductive foreign matter reaches the second unit cell electrically connected to the first unit cell. Therefore, the negative electrode of the unit cell through which the conductive foreign matter penetrates first can be reliably broken before an external short circuit occurs via the busbar and the conductive foreign matter.

According to the aspect, at least one terminal of the positive electrode terminal and the negative electrode terminal of a first unit cell of the plurality of the unit cells, disposed at at least one end portion of the battery pack in the direction in which the unit cells are arranged is electrically connected to a second unit cell of the plurality of unit cells by the busbar. Between the first and second unit cells electrically connected to each other by the busbar, two or more of the unit cells that are not electrically connected to the first and second unit cells may be disposed. In the battery pack in which the unit cells are arranged, typically, the first unit cell disposed at the end portion in the battery pack in the arrangement direction of the unit cells is the most prone to the conductive foreign matter sticking into the battery pack. By disposing two or more of the other unit cells between the first unit cell at the end portion and the second unit cell electrically connected to the unit cell at the end portion, the negative electrode of the first unit cell at the end portion can be reliably broken by the internal short circuit before the conductive foreign matter is stuck and an external short circuit occurs via the busbar.

According to the aspect, among the unit cells, the unit cell having a positive electrode output terminal as the positive electrode terminal configured to be connected to an outside of the battery pack may be disposed at a position other than the unit cells disposed at both end portions of the battery pack in the direction in which the unit cells are arranged. When a battery pack is constructed in the related art, a unit cell having a positive electrode output terminal is generally disposed at an end portion of the battery pack in the arrangement direction of the unit cells. Contrary to this, in the battery pack disclosed herein, the unit cell having the positive electrode output terminal is disposed at a position other than the end portion of the battery pack in the arrangement direction of the unit cells. Accordingly, a battery pack in which all unit cells are electrically connected to the unit cells disposed apart from each other can be easily constructed.

According to the aspect, among the unit cells, the unit cells adjacent to each other may be disposed such that the positive electrode terminals and the negative electrode terminals of the unit cells are disposed adjacent to each other in the direction in which the unit cells are stacked.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
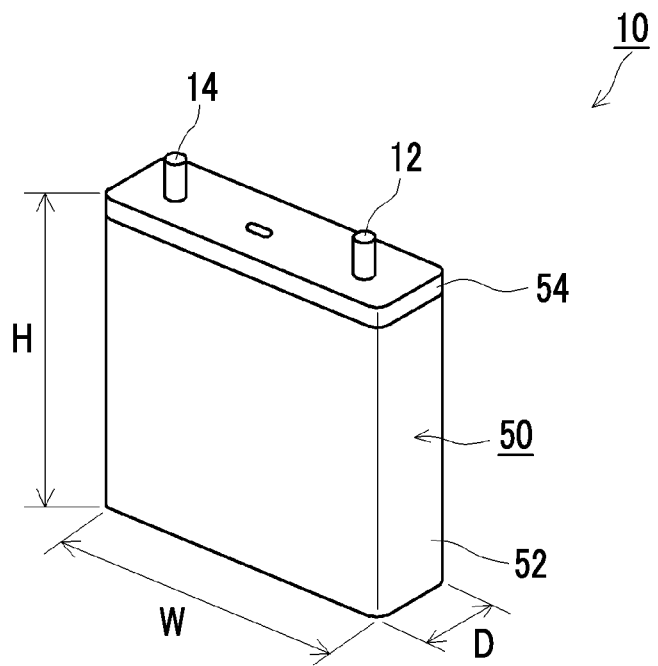
FIG. 1 is a perspective view schematically illustrating a unit cell included in a battery pack according to an embodiment.

Hereinafter, as a battery pack according to an embodiment, a battery pack which uses a lithium-ion secondary battery as a unit cell and is formed by connecting a plurality of the lithium-ion secondary batteries will be exemplified. In the battery pack disclosed herein, a battery used as the unit cell is not limited to the lithium-ion secondary battery, and for example, a nickel-metal hydride battery having a stacked electrode body can be used.

In the following drawings, like members and parts exhibiting the same action are denoted by like reference numerals. The dimensional relationship (length, width, thickness, and the like) in each of the drawings does not reflect the actual dimensional relationship. In addition, matters that are not particularly mentioned in the specification but are needed to implement the embodiment (for example, the configuration and manufacturing method of an electrolyte, general technologies related to the construction of a lithium-ion secondary battery, and the like) can be recognized as design matters of those skilled in the art based on the related art.

1. Configuration of Unit Cell

Figure 2:
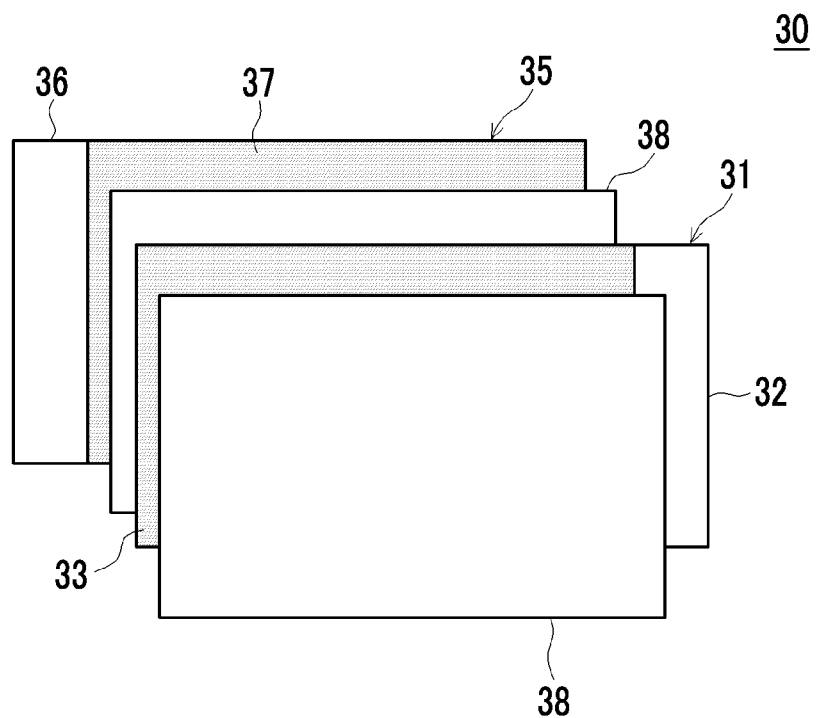
FIG. 2 is an explanatory view schematically illustrating each of the members constituting an electrode body in the embodiment.
Figure 3:
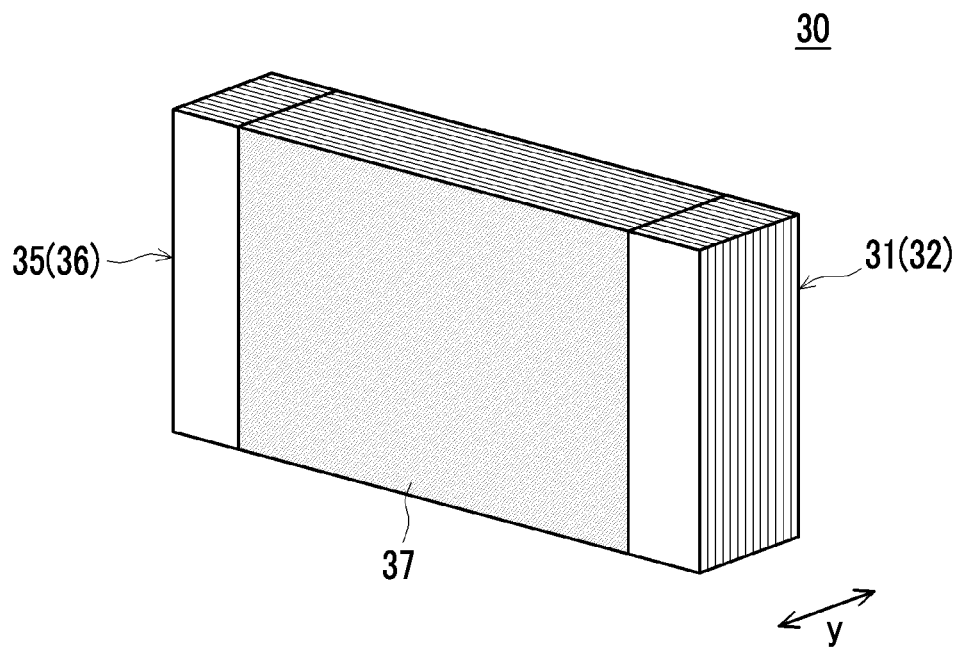
FIG. 3 is a perspective view schematically illustrating the configuration of the electrode body of the embodiment.

First, the unit cell included in the battery pack according to the embodiment will be described. FIG. 1 is a perspective view schematically illustrating the unit cell included in the battery pack according to the embodiment, FIG. 2 is an explanatory view schematically illustrating each of the members constituting an electrode body in the embodiment, and FIG. 3 is a perspective view schematically illustrating the configuration of the electrode body of the embodiment. A unit cell 10 included in the battery pack according to the embodiment is configured by accommodating an electrode body 30 illustrated in FIGS. 2 and 3 in a rectangular battery case 50 illustrated in FIG. 1.

(1) Battery Case

As illustrated in FIG. 1, the battery case 50 is configured to include a flat rectangular case body 52 having an open upper surface, and a lid 54 that blocks the opening of the upper surface. It is preferable that the battery case 50 is formed of, for example, metal or a resin. In addition, the lid 54 that forms the upper surface of the battery case 50 is provided with a positive electrode terminal 12 and a negative electrode terminal 14. Although not illustrated, the positive electrode terminal 12 is connected to a positive electrode of the electrode body in the battery case 50, and the negative electrode terminal 14 is connected to a negative electrode. The positive electrode terminal 12 is preferably formed of aluminum, an aluminum alloy or the like, and the negative electrode terminal 14 is preferably formed of copper, a copper alloy, or the like.

(2) Electrolyte

In the battery case 50 described above, an electrolyte is accommodated together with the electrode body 30 (see FIG. 3). As the electrolyte, an electrolyte similar to the electrolyte used in a lithium-ion secondary battery in the related art can be used without particular limitations. For example, a non-aqueous electrolyte in which lithium hexafluorophosphate (LiPF$_6$) is contained at a concentration of about 1 mol/L in a mixed solvent (for example, a volume ratio of 3:4:3) of ethylene carbonate (EC), dimethyl carbonate (DMC), and ethyl methyl carbonate (EMC) can be used.

(3) Electrode Body

As illustrated in FIGS. 2 and 3, the electrode body 30 in the embodiment is a stacked electrode body having a structure in which rectangular sheet-shaped positive electrodes 31 and negative electrodes 35 are alternately stacked, and a separator 38 is disposed between the positive electrode 31 and the negative electrode 35. As the electrode body, other than the stacked electrode body illustrated in FIGS. 2 and 3, a wound electrode body in which long sheet-shaped positive electrodes and negative electrodes are overlapped and wound, and thus the sheets are stacked may be used.

As each of the materials constituting the electrode body 30, a material similar to the material used in a lithium-ion secondary battery in the related art can be used without particular limitations. For example, the positive electrode 31 is configured by applying a positive electrode active material layer 33 to the surface of a positive electrode current collector 32 formed of a rectangular aluminum foil or the like. The positive electrode active material layer 33 includes a positive electrode active material and other additives. As the positive electrode active material, a lithium-containing compound (lithium transition metal composite oxide) containing the element lithium and one type or two or more types of transition metal elements can be used. Examples of the lithium transition metal composite oxide include ternary lithium-containing composite oxides such as a lithium nickel composite oxide (for example, LiNiO$_2$), a lithium cobalt composite oxide (for example, LiCoO$_2$), a lithium manganese composite oxide (for example, LiMn$_2$O$_4$), and a lithium nickel cobalt manganese composite oxide (for example, LiNi$_{1/3}$Co$_{1/3}$Mn$_{1/3}$O$_2$). As other additives, a conductive material and a binder can be used. Examples of the conductive material include a carbon material such as carbon black and carbon fiber. Examples of the binder include polyvinylidene fluoride (PVDF), polyvinylidene chloride (PVDC), polyethylene oxide (PEO), polytetrafluoroethylene (PTFE), carboxymethyl cellulose (CMC), and styrene butadiene rubber (SBR).

The negative electrode 35 is configured by applying a negative electrode active material layer 37 containing a negative electrode active material to the surface of a negative electrode current collector 36 formed of a rectangular copper foil or the like. The negative electrode active material layer 37 includes the negative electrode active material and other additives. As the negative electrode active material, for example, graphite, non-graphitizable carbon (hard carbon), easily graphitizable carbon (soft carbon), carbon nanotubes, or a carbon material of a combination thereof can be used. As other additives, a binder, a thickener, a dispersant, and the like can be appropriately used. For example, as the binder, a binder similar to the binder used in the above-mentioned positive electrode active material layer can be used. As the thickener, carboxymethyl cellulose (CMC), methyl cellulose (MC), or the like can be used.

As the separator 38, a resin porous sheet (film) having a function of electrically insulating the positive electrode 31 and the negative electrode 35 from each other, a function of holding the non-aqueous electrolyte, and the like is used. As the separator 38, for example, polyethylene (PE), polypropylene (PP), polyester, cellulose, polyamide, or the like can be used.

2. Configuration of Battery Pack

Figure 4:
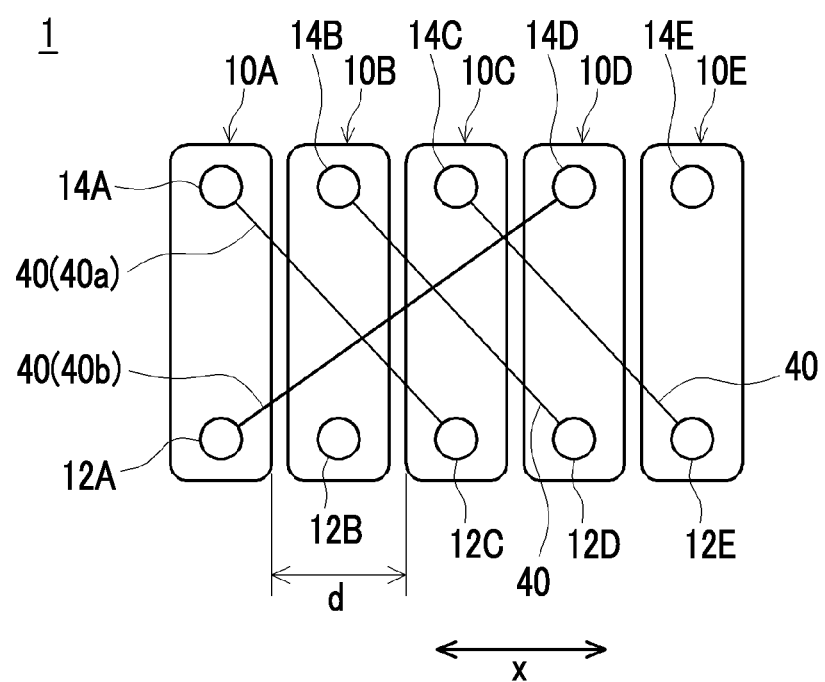
FIG. 4 is a plan view schematically illustrating the battery pack according to the embodiment.

FIG. 4 is a plan view schematically illustrating the battery pack according to the embodiment. As illustrated in FIG. 4, a battery pack 1 according to the embodiment includes five unit cells having the same configuration as described above. The battery pack 1 is constructed by arranging the five unit cells 10A to 10E and electrically connecting the positive electrode terminals 12 to the negative electrode terminals 14 in the unit cells 10A to 10E. Hereinafter, the configuration of the battery pack according to the embodiment will be described in detail.

As illustrated in FIG. 4, the battery pack 1 according to the embodiment includes the five unit cells 10A to 10E having a rectangular shape, and the unit cells 10A to 10E are arranged adjacent to one another. The arrangement direction x of the unit cells 10A to 10E is the same direction as the stacking direction y (see FIG. 3) of the positive and negative electrodes of the electrode body 30 having the above-described stacked structure. The unit cells 10A to 10E arranged in the arrangement direction x are connected electrically in series by connecting positive electrode terminals 12A to 12E to negative electrode terminals 14A to 14E by busbars 40. Although not illustrated, the unit cells 10A to 10E are restrained along the arrangement direction x by a restraint member.

In the battery pack 1 according to the embodiment, the positive electrode terminal 12B of the unit cell 10B is not connected to the negative electrode terminal of another unit cell and is used as a positive electrode output terminal which is opened to be connected to the outside. In addition, the negative electrode terminal 14E of the unit cell 10E serves as a negative electrode output terminal which is opened to be connected to the outside. In the specification, a side on which the unit cell 10E having the negative electrode terminal (negative electrode output terminal) 14E is disposed is referred to as a downstream side in the arrangement direction x, and the opposite side is referred to as an upstream side in the arrangement direction x. That is, the left side in FIG. 4 is the upstream side in the arrangement direction, and the right side is the downstream side. In the following description, the unit cell 10A disposed on the most upstream side in the arrangement direction x is called the first unit cell 10A, and the unit cell 10E disposed on the most downstream side is called the fifth unit cell 10E.

In the battery pack 1 according to the embodiment, each of the unit cells is electrically connected to the unit cells disposed apart therefrom excluding the adjacent unit cells, by the busbars 40. Specifically, in the embodiment, the first unit cell 10A disposed on the most upstream side in the arrangement direction x is not connected to the second unit cell 10B disposed adjacent to the first unit cell 10A and is connected to the unit cells disposed apart from the first unit cell 10A (the third unit cell 10C and the fourth unit cell 10D). Hereinafter, although detailed descriptions are omitted, in the battery pack 1 according to the embodiment, the second to fifth unit cells 10B to 10E are not connected to the adjacent unit cells and are connected to the unit cells disposed apart from each other.

Figure 5:
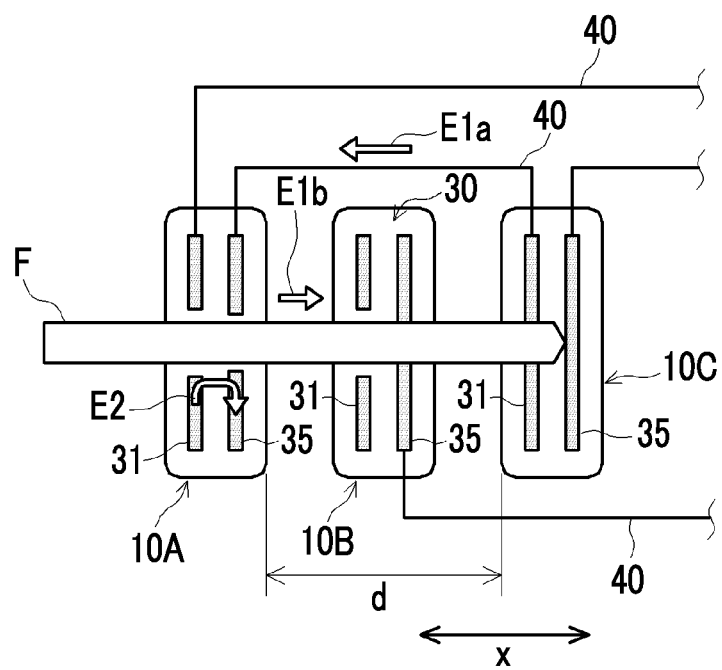
FIG. 5 is an explanatory view schematically illustrating a state in which conductive foreign matter is stuck into the battery pack according to the embodiment.

A case where the conductive foreign matter F such as a nail is stuck into the battery pack 1 according to the embodiment with the configuration described above and penetrates through the unit cells 10A to 10E to penetrate through the positive electrodes 31 and the negative electrodes 35 of the unit cells 10A to 10E in the stacking direction will be described. FIG. 5 is an explanatory view schematically illustrating a state in which the conductive foreign matter is stuck into the battery pack according to the embodiment. For convenience of description, in FIG. 5, the fourth unit cell 10D and the fifth unit cell 10E are omitted.

In the embodiment, as described above, the first unit cell 10A is not electrically connected to the second unit cell 10B adjacent to the first unit cell 10A and is electrically connected to the third unit cell 10C disposed apart from the first unit cell 10A. Accordingly, the negative electrode 35 of the first unit cell 10A is damaged by an internal short circuit before a short circuit current of an external short circuit via the conductive foreign matter F and the busbar 40 occurs. Accordingly, the contact resistance between the negative electrode 35 and the conductive foreign matter F can be significantly increased. Therefore, an external short circuit that may occur between the two unit cells 10A, 10C is suppressed and a rapid temperature increase can be suppressed.

Specifically, when the conductive foreign matter F is stuck into the battery pack 1 according to the embodiment, first, at a time when the conductive foreign matter F penetrates through the first unit cell 10A, an internal short circuit in which a short circuit current E2 flows from the positive electrode 31 to the negative electrode 35 inside the first unit cell 10A occurs. Next, the conductive foreign matter F advances to the downstream side in the arrangement direction x and penetrates through the second unit cell 10B. However, since the second unit cell 10B is not directly connected to the first unit cell 10A by the busbars, an external short circuit does not occur between the first unit cell 10A and the second unit cell 10B. In addition, when the conductive foreign matter F further advances to the downstream side and reaches the positive electrode 31 of the third unit cell 10C, a conduction path via the busbar 40 and the conductive foreign matter F is formed, and a short circuit current E1a flows through the busbar 40. However, in the embodiment, since the first unit cell 10A and the third unit cell 10C are disposed apart from each other, at a time when the short circuit current E1a via the busbar 40 is generated, the negative electrode 35 of the first unit cell 10A is already damaged by the short circuit current E2 of the internal short circuit. Accordingly, the contact resistance between the negative electrode 35 and the conductive foreign matter F is significantly increased inside the first unit cell 10A. Therefore, the short circuit current E1a flowing into the negative electrode 35 of the first unit cell 10A via the busbar 40 undergoes a large resistance such that a short circuit current E1b flowing into the third unit cell 10C via the conductive foreign matter F is significantly decreased. As a result, a rapid temperature increase caused by the large short circuit current flowing into the third unit cell 10C can be suppressed. In addition, in the battery pack 1 according to the embodiment, as described above, each of the second to fifth unit cells 10B to 10E is electrically connected to the unit cells disposed apart therefrom via the busbars excluding the adjacent unit cells. Therefore, a rapid temperature increase caused by an external short circuit via the busbars 40 is suppressed. Therefore, with the battery pack 1 according to the embodiment, when the sharp conductive foreign matter F is stuck, an external short circuit that occurs between the unit cells 10A to 10E is suppressed, and a rapid temperature increase of the unit cell due to the external short circuit can be suppressed.

In the above description, the conductive foreign matter F is stuck from the upstream side toward the downstream side in the arrangement direction (that is, in a direction from the first unit cell 10A to the fifth unit cell 10E). However, according to the embodiment, even in the case where the conductive foreign matter F is stuck from the downstream side toward the upstream side in the arrangement direction (that is, in a direction from the fifth unit cell 10E to the first unit cell 10A), each of the unit cells is connected to the unit cells disposed apart therefrom. Therefore, a rapid temperature increase caused by an external short circuit via the busbars 40 can be appropriately suppressed. Therefore, when the battery pack 1 according to the embodiment is mounted on a moving object such as a vehicle, the first unit cell 10A may be disposed on the front side of the moving object in an advancing direction of the moving object, or the fifth unit cell 10E may be disposed on the front side of the moving object in the advancing direction. However, in a battery pack having a plurality of unit cells with a general structure, a rapid temperature increase tends to easily occur in a case where conductive foreign matter is stuck in a direction from a unit cell side having a positive electrode output terminal (that is, the upstream side in FIG. 4). Therefore, the battery pack 1 according to the embodiment is more preferably used as a power supply for driving a moving object having a structure in which the unit cell having the positive electrode output terminal has to be disposed on the front side of the moving object in a travelling direction.

The interval d (see FIG. 5) between the unit cells which are electrically connected to each other by the busbar and are disposed apart from each other is preferably 25 mm or more and is more preferably 25 mm to 40 mm. In a case of a battery pack constructed using a general material, a time of about 0.5 seconds is taken from when the conductive foreign matter F penetrates through the first unit cell 10A until when the negative electrode 35 is broken by the internal short circuit. As described above, in a case where the interval d between the unit cells 10A, 10C connected to each other by the busbar 40 is set to 25 mm or more, the time taken from when the conductive foreign matter F penetrates through the first unit cell 10A until the conductive foreign matter F reaches the third unit cell 10C may be about 1 second. Therefore, the negative electrode 35 of the first unit cell 10A can be reliably broken by the internal short circuit before the conductive foreign matter F reaches the third unit cell 10C and an external short circuit occurs.

Figure 8:
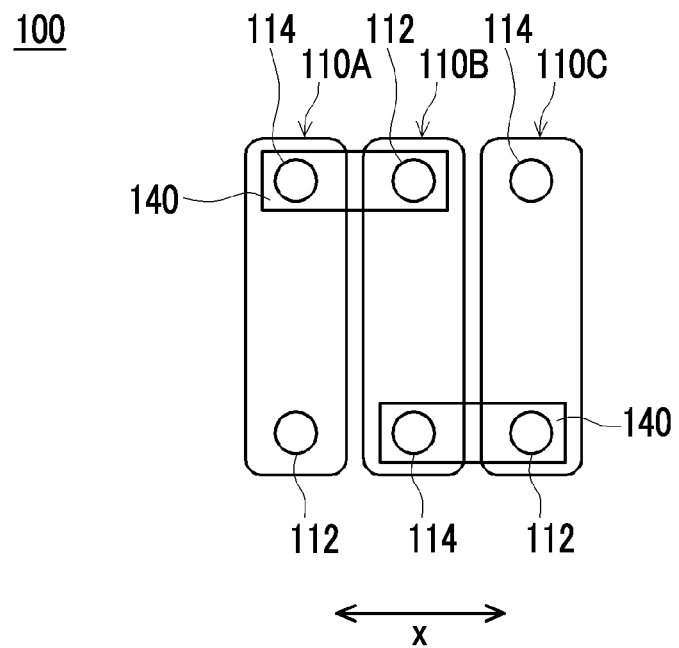
FIG. 8 is a plan view schematically illustrating a battery pack in the related art.
Figure 9:
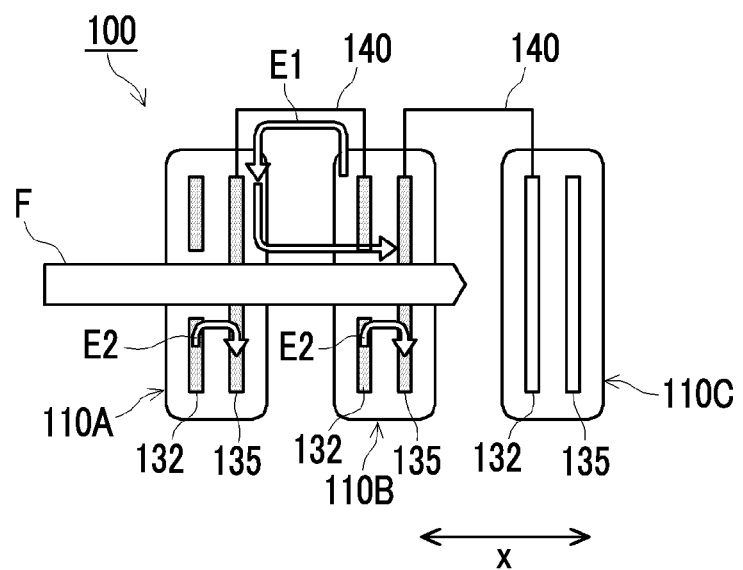
FIG. 9 is an explanatory view schematically illustrating a state in which conductive foreign matter is stuck into the battery pack in the related art.

In addition, in the battery pack 1 according to the embodiment, unlike the battery pack 100 in the related art as described in FIG. 8, intersections between the busbars 40 are formed when the unit cells 10A to 10E are electrically connected. It is preferable that the surface of the busbar 40 is coated with an insulating resin or the like so that the intersections between the busbars 40 do not conduct current.

Figure 6:
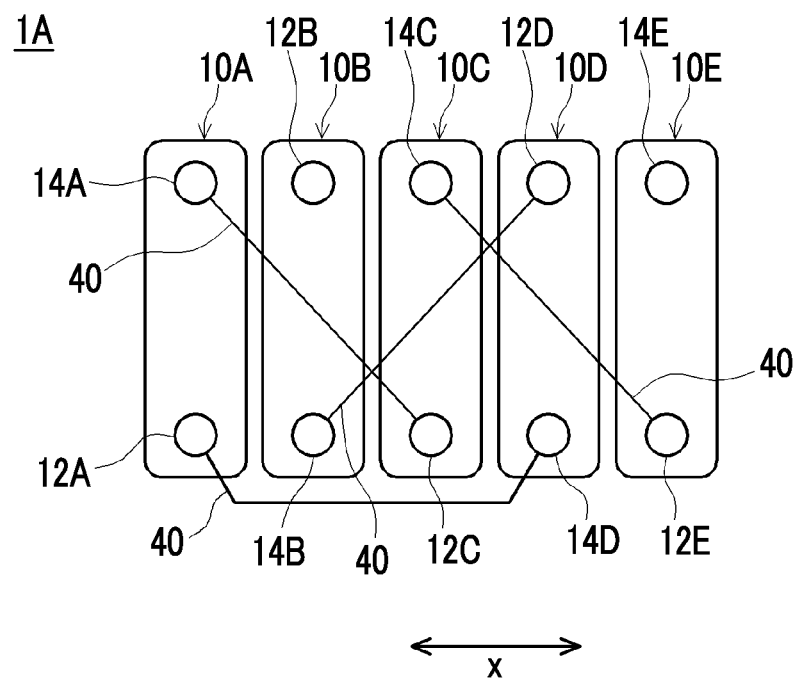
FIG. 6 is a plan view schematically illustrating a battery pack according to another embodiment.

Each of the unit cells constituting the battery pack may be electrically connected to the unit cells disposed apart therefrom excluding the adjacent unit cells, and is not limited to the above-described embodiment. For example, as illustrated in FIG. 6, even in a battery pack 1A in which electrical connections between the unit cells 10A to 10E are constructed, a rapid temperature increase that occurs in the case where the conductive foreign matter is stuck can be suppressed. In the battery pack 1A, the even-numbered unit cells (the second unit cell 10B and the fourth unit cell 10D) are disposed in an inverted manner, and the positive electrode terminals 12A to 12E and the negative electrode terminals 14A to 14E between the adjacent unit cells are close to each other. Even in the case of the battery pack 1A, electrical connections between the second unit cell 10B, the fourth unit cell 10D, the first unit cell 10A, the third unit cell 10C, and the fifth unit cell 10E are constructed in this order via the busbars 40, and the unit cells that are electrically connected to each other can be disposed apart from each other. Therefore, a rapid temperature increase that occurs in the case where the conductive foreign matter is stuck can be suppressed.

In both the battery pack 1 illustrated in FIG. 4 and the battery pack 1A illustrated in FIG. 6, the positive electrode terminal 12A of the first unit cell 10A is connected to the negative electrode terminal 14D of the fourth unit cell 10D by the busbar 40. The two unit cells are disposed between the first unit cell 10A and the fourth unit cell 10D. As described above, the first unit cell 10A is disposed at the end portion in the battery pack 1 or the battery pack 1A in the arrangement direction x, and conductive foreign matter such as a nail is easily stuck into the first unit cell 10A. Therefore, by connecting the first unit cell 10A to the fourth unit cell 10D disposed apart therefrom by the two or more unit cells, a temperature increase caused by a short circuit current through the busbar can be more reliably suppressed.

Furthermore, in both the battery pack 1 illustrated in FIG. 4 and the battery pack 1A illustrated in FIG. 6, the unit cell 10B having the positive electrode terminal (positive electrode output terminal) 12B is not disposed at both end portions of the battery pack 1 or the battery pack 1A in the arrangement direction x. As described above, by disposing the unit cell having the positive electrode terminal (positive electrode output terminal) 12B at a position other than the end portions in the arrangement direction, the battery pack in which each of the unit cells is connected to the unit cells disposed apart therefrom can be easily constructed.

Although the battery packs 1, 1A according to the above-described embodiment are configured to include the five unit cells, the number of unit cells constituting the battery pack is not particularly limited as long as the unit cells which are disposed apart from each other can be electrically connected to each other. For example, as long as a battery pack has at least four unit cells, the battery pack in which the unit cells which are disposed apart from each other are electrically connected to each other can be constructed.

TEST EXAMPLE

Hereinafter, test examples will be described, but the following test examples are not intended to limit the embodiment.

1. Production of Battery Pack of Test Examples (1) Test Example 1

A rectangular positive electrode in which a positive electrode active material layer having a mixture of a positive electrode active material ($LiNi_{1/3}Co_{1/3}Mn_{1/3}O_2$), a conductive material (acetylene black), and a binder (PVDF) in a mass ratio of 94:3:3 is formed on both surfaces of a positive electrode current collector (aluminum foil) having a thickness of 12 μm was produced. On the other hand, a rectangular negative electrode in which a negative electrode active material layer having a mixture of a negative electrode active material (graphite), a thickener (CMC), and a binder (SBR) in a mass ratio of 98:1:1 is formed on both surfaces of a negative electrode current collector (copper foil) having a thickness of 10 μm was produced. In addition, a stacked electrode body was produced by stacking 10 positive electrodes and 10 negative electrodes mentioned above with separators interposed therebetween, the stacked electrode body was accommodated in a rectangular battery case (with a width W of 148 mm, a thickness D of 26.4 mm, and a height H of 91 mm) as illustrated in FIG. 1 along with the electrolyte, thereby producing a unit cell having a capacity of 35 Ah.

Then, five unit cells produced by the above procedure were prepared, and connections by busbars were constructed so that each of the unit cells was electrically connected to the unit cells disposed apart therefrom. Specifically, in Test Example 1, as illustrated in FIG. 4, the unit cells 10A to 10E were electrically connected. In addition, by restraining the unit cells 10A to 10E along the arrangement direction at a restraint pressure of 1,000 N, a battery pack of Test Example 1 was constructed. In addition, as a result of measuring the interval d between the unit cells connected by the busbars in the battery pack in which the unit cells were restrained, the interval d between the unit cells was 25 mm.

(2) Test Example 2

After producing five unit cells by the same procedure as in Test Example 1 described above, the unit cells 10A to 10E were connected as illustrated in FIG. 6, and the unit cells were restrained after the connection, thereby constructing a battery pack of Test Example 2. The interval d between the unit cells connected by the busbars in Test Example 2 was 25 mm.

(3) Test Example 3

In Test Example 3, a battery pack was constructed by the same procedure as in Test Example 1 except that a rectangular battery case (having a thickness D of 21 mm) having a smaller thickness D than those of Test Examples 1 and 2 was used. In addition, the constructed battery pack of Test Example 3 was restrained at a restraint pressure of 1,000 N, and the interval d between the unit cells connected by the busbars in this state was measured. As a result, the interval d between the unit cells was 20 mm.

(4) Test Example 4

Figure 7:
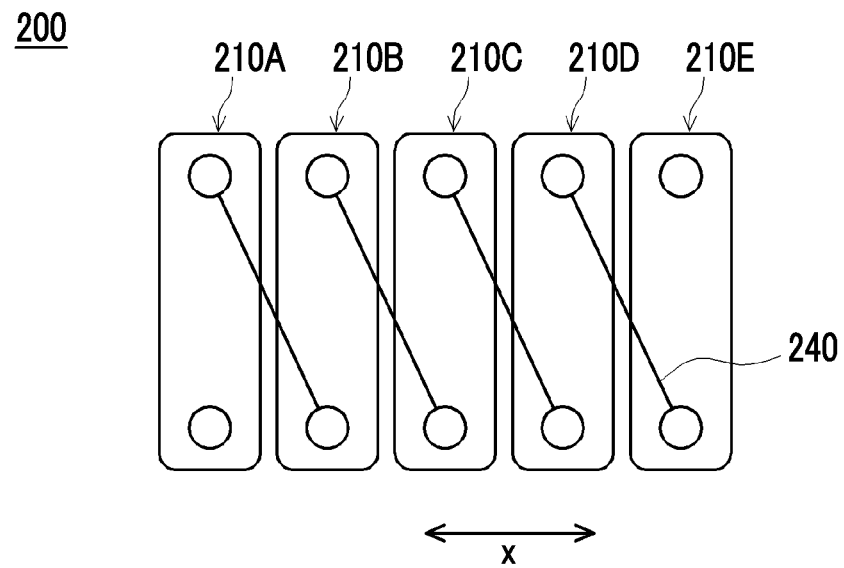
FIG. 7 is a plan view schematically illustrating a battery pack of Test Example 4.

In Test Example 4, after producing five unit cells by the same procedure as in Test Example 1 described above, the five unit cells 210A to 210E were connected by busbars 240 as illustrated in FIG. 7. In a battery pack 200 illustrated in FIG. 7, the unit cells connected by the busbars 240 are disposed adjacent to one another.

2. Evaluation Test

As an evaluation test for evaluating the constructed battery packs of Test Examples 1 to 4, the following nail penetration test was conducted. In the nail penetration test, first, under an environment at a temperature of 25° C., the battery packs of Test Examples 1 to 4 were adjusted to a state of charge (SOC) of 100%. Next, two thermocouples were attached to the outer surface of the battery case, and a tungsten nail was pierced from the upstream side toward the downstream side in the arrangement direction of the unit cells. The diameter of the nail was 6 mm, and the angle of the tip of the nail was 60°. By perpendicularly piercing the vicinity of the center of the wide surface of the rectangular battery case with the nail at a speed of 25 mm/sec, all the unit cells constituting the battery pack were penetrated.

(1) Rate of Increase in Contact Resistance Between Negative Electrode and Nail

While the nail advanced during the nail penetration test, the resistance value between the negative electrode terminal and the nail was measured, and the resistance value between the negative electrode and the nail in an n-th unit cell when the nail reached an (n+2)-th unit cell was measured. The average value of the measured resistance values was referred to as R1. Next, battery packs of Test Examples 1 to 4 in a state of charge of 0 V (SOC 0%) were separately produced, the nail penetration test was conducted thereon under the same conditions as above, and the average value R0 of the resistance values in the case of an SOC of 0% was measured. The ratio of R1 to the obtained R0 was calculated as the ratio of increase (R1/R0) in the contact resistance. The results are shown in Table 1.

(2) Measurement of Short Circuit Current

While the nail penetration test was conducted on the battery packs of Test Examples 1 to 4, a current flowing through the busbars electrically connecting the unit cells was measured as a short circuit current of an external short circuit. The maximum value of the short circuit currents of the external short circuits measured in each of the test examples is shown in Table 1.

(3) Measurement of Highest Temperature

While the nail penetration test was conducted on the battery packs of Test Examples 1 to 4, the temperatures of the unit cells constituting each of the battery packs were measured. The highest temperature among the measured temperatures is shown in Table 1 as the highest temperature of the unit cells.

3. Evaluation Results

From the results shown in Table 1, the maximum value of the short circuit currents in Test Examples 1 to 3 was smaller than that in Test Example 4, and the highest temperature of the unit cells was low. Accordingly, as in Test Examples 1 to 3, it could be confirmed that by electrically connecting each of the unit cells constituting the battery pack to the unit cells disposed apart therefrom, the short circuit current of the external short circuit flowing via the conductive foreign matter and the busbars can be reduced, and a temperature increase caused by the short circuit current of the external short circuit can be suppressed.

In comparison between Test Examples 1 to 3, it could be confirmed that in Test Examples 1 and 2 in which the interval d between the unit cells connected by the busbars was set to 25 mm or more, the rate of increase in the contact resistance between the negative electrode and the nail is large, and a temperature increase in the unit cells was suppressed more favorably. It is understood that this is because in the battery packs of Test Examples 1 and 2, there was a time of about 1 second from when the nail had penetrated through the n-th unit cell until when the nail reached the (n+2)-th unit cell and the negative electrode was sufficiently broken at a time when the nail reached the (n+2)-th unit cell. On the other hand, it is understood that in the battery pack of Test Example 3, since the negative electrode of the n-th unit cell was broken after the nail began to stuck into the (n+2)-th unit cell, the rate of increase in the contact resistance when the nail reached the (n+2)-th unit cell was approximately equal to that in Test Example 4, and the highest temperature was higher than those of Test Examples 1 and 2.

While the specific examples have been described above in detail, the specific examples are merely examples and do not limit the scope of the claims. Techniques described in the claims include modifications and examples of the specific examples described above.

What is claimed is:

1. A battery pack comprising:
   a plurality of unit cells each including an electrode body having a structure in which a positive electrode and a negative electrode are stacked, the plurality of unit cells being stacked adjacent to one another in the same direction as a direction in which the positive electrode and the negative electrode of the electrode body are stacked; and
   a busbar that electrically connects a positive electrode terminal of one of the plurality of unit cells to a negative electrode terminal of another of the plurality of unit cells in series,

TABLE 1

|  | Connection between adjacent unit cells by busbars | Interval d between unit cells connected by busbars (mm) | Rate of increase in contact resistance (%) | Maximum value of short circuit current (A) | Highest temperature of unit cells (° C.) |
| --- | --- | --- | --- | --- | --- |
| Test Example 1 | Absent | 25 | 8.0 | 26 | 400 |
| Test Example 2 | Absent | 25 | 7.2 | 30 | 420 |
| Test Example 3 | Absent | 20 | 1.1 | 660 | 580 |
| Test Example 4 | Present | — | 1.1 | 700 | 620 | wherein among all of the plurality of unit cells in the battery pack that are electrically connected to each other in series, adjacent unit cells of the plurality of unit cells are not directly electrically connected to each other.

2. The battery pack according to claim 1, wherein the one of the plurality of unit cells and the another of the plurality of unit cells that are electrically connected to each other by the busbar, are disposed apart from each other at an interval of 25 mm or more between the plurality of unit cells.

3. The battery pack according to claim 1, wherein:
a first unit cell of the plurality of unit cells having at least one terminal of a positive electrode terminal and a negative electrode terminal, the first unit cell being disposed at at least one end portion of the battery pack in the direction in which the plurality of unit cells are stacked is electrically connected to a second unit cell of the plurality of unit cells by the busbar; and
between the first unit cell and the second unit cell electrically connected to each other by the busbar, two or more of the unit cells of the plurality of unit cells that are not electrically connected to at least the first unit cell or the second unit cell are disposed.

4. The battery pack according to claim 1, wherein, among the plurality of unit cells, a unit cell having a positive electrode output terminal as a positive electrode terminal configured to be connected to an outside of the battery pack is disposed at a position other than the unit cells disposed at both end portions of the battery pack in the direction in which the plurality of unit cells are stacked.

5. The battery pack according to claim 1, wherein, among the plurality of unit cells, the unit cells adjacent to each other are disposed such that the positive electrode terminals and the negative electrode terminals of the plurality of unit cells are disposed adjacent to each other in the direction in which the plurality of unit cells are stacked.

6. The battery pack according to claim 1, wherein
the plurality of unit cells each have the same shape to each other, and
the battery pack further comprises a battery case which accommodates the plurality of unit cells, the battery case having a rectangular shape.

7. The battery pack according to claim 1, wherein each of the plurality of unit cells has a positive electrode terminal and a negative electrode terminal, and wherein, among the plurality of unit cells that has the positive electrode terminal and the negative electrode terminal electrically connected through a busbar, the plurality of unit cells that are electrically connected to each other are not disposed adjacent to each other.

* * * * *